United States Patent [19]

Mercier

[11] 4,247,806

[45] Jan. 27, 1981

[54] GARAGE DOOR OPENER

[75] Inventor: Carl E. Mercier, Oconomowoc, Wis.

[73] Assignee: Holmes-Hally Industries, Los Angeles, Calif.

[21] Appl. No.: 893,957

[22] Filed: Apr. 6, 1978

[51] Int. Cl.³ .............................................. G05D 3/08
[52] U.S. Cl. ...................... 318/267; 49/28; 318/467; 318/469
[58] Field of Search ............... 318/265, 266, 264, 267, 318/281, 283, 288, 290, 466–469, 476, 455, 16; 49/28–30; 361/28, 31

[56] References Cited

U.S. PATENT DOCUMENTS

| | | | |
|---|---|---|---|
| 3,287,618 | 11/1966 | Stephens | 318/265 |
| 3,581,174 | 5/1971 | Hammer | 318/466 |
| 3,617,835 | 11/1971 | Dreher | 318/466 |
| 3,617,837 | 11/1971 | Beck | 318/266 |
| 3,813,590 | 5/1974 | Ellmore | 318/468 |
| 3,891,909 | 6/1975 | Newson | 318/467 |
| 4,055,623 | 10/1977 | Gatland et al. | 49/28 |
| 4,107,877 | 8/1978 | Lee | 49/28 |
| 4,131,830 | 12/1978 | Lee et al. | 318/469 |

Primary Examiner—David Smith, Jr.
Assistant Examiner—M. K. Mutter

[57] ABSTRACT

A garage door opener includes a radio receiver and a push button each operable to initiate a pulse for effecting a switching device which in turn energizes a latching relay. Operation of the latching relay completes an energizing circuit to the appropriate winding of a reversible motor which moves the door toward an open or closed position. A sensing circuit is operable for effecting the reversal of the latching relay to change the direction of motor operation in the event the door engages an object in its path. A foot switch may also be provided for positively sensing an obstacle and reversing the drive motor. A transmitter may be provided with an impulse circuit to limit the duration of the system actuating signal regardless of how long the transmitter push button is depressed.

18 Claims, 1 Drawing Figure

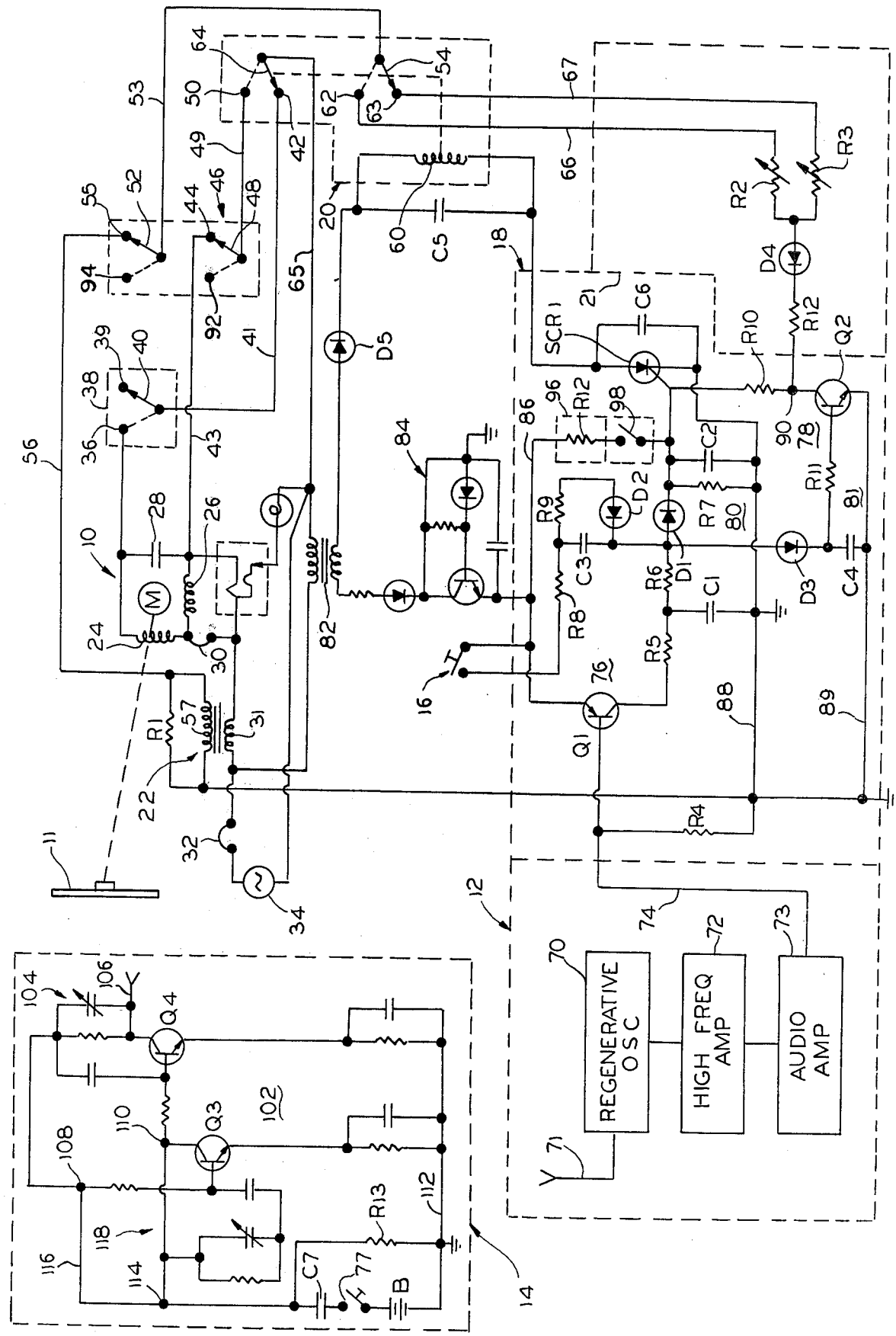

GARAGE DOOR OPENER

BACKGROUND OF THE INVENTION

This invention relates to garage door openers, and more specifically to a safety circuit for a garage door opener control.

Garage door openers generally comprise a drive motor which is coupled to the door by means of a screw shaft or chain. In order to prevent injury to individuals who may be in the path of the door or to provent damage to the door or the drive system in the event an immovable object is encountered, most garage door opening systems include some mechanism for reversing the direction of the door operation in the event an object is encountered when the door is being lowered. In many garage door opening systems, the reversing apparatus consists of a mechanical device which senses a predetermined resistance to motor operations. Such devices become somewhat insensitive when applied to a door having a substantial frictional drag. In addition, conventional garage door opening devices do not reverse if an obstacle is encountered when the door is being opened. In addition, some conventional garage door openers suffer the disadvantage that safety systems are disabled if the transmitter or manual switches are held down.

SUMMARY OF THE INVENTION

It is an object of the invention to provide a new and improved garage door opener control circuit.

Another object of the invention is to provide a garage door opener control circuit which will effect the reversal of door operation when an obstacle is encountered in either direction of door movement.

Another object of the invention is to provide a garage door opener control circuit in which the safety circuit is not disabled when actuating switches are maintained in a closed position.

Yet another object of the invention is to provide a garage door opener control circuit which will effect door reversal regardless of frictional drag.

These and other objects and advantages of the present invention will become more apparent from the detailed description thereof taken with the accompanying drawings.

BRIEF DESCRIPTION OF THE DRAWINGS

The single FIGURE of the drawing schematically illustrates a garage door opener control circuit in accordance with the preferred embodiment of the present invention.

BRIEF DESCRIPTION OF THE PREFERRED EMBODIMENT

The garage door opener control is shown in FIG. 1 to include a reversible drive motor 10, which is suitably coupled to a garage door 11. For a more complete description of apparatus for coupling a drive-motor to a garage door, reference is made to co-pending Application Ser. No. 812,165, filed July 1, 1977.

Operation of the motor 10 can be initiated either by a radio receiver 12 upon receipt of an appropriate radio frequency signal from a transmitter 14 or upon the closing of a manual switch 16. Coupled to the receiver 12 and switch 16 is a control circuit 18 responsive to an appropriate signal from either for actuating a switching device which in the illustrated embodiment takes the form of a silicon-controlled rectifier SCR1. Operation of SCR1 in turn actuates a latching relay 20 which initiates a door raising or lowering operation by motor 10. In the event the door 11 encounters an obstacle to its upward or downward movement, an increase in motor-winding current will be sensed by a safety circuit 21 through the agency of a current transformer 22. Control circuit 18 will then deliver a gating signal to SCR1 which pulses the latching relay 20 to effect a reversal of motor 10 and consequently door 11.

The motor 10 may be of a conventional type and in the illustrated example consists of a capacitive start motor having a forward of door-opening winding 24, a door-close or reverse winding 26 and a starting capacitor 28. The common connection of motor windings 24 and 26 is connected through a thermal overload switch 30, the primary winding 31 of current transformer 22 and a second thermal overload switch 32 to an alternating current source 34. The common terminal of the motor 10 door-open winding 24 and capacitor 28 is connected to contact 36 of an up-limit switch 38 which also includes a second terminal 39 and a switch blade 40 connected by conductor 41 to a first terminal 42 of latching relay 20. The common terminal of motor 10 door-close winding 26 and capacitor 28 is connected by conductor 43 to terminal 44 of down-limit switch 46 which also includes a first switch blade 48 connected by conductor 49 to terminal 50 of latching relay 20 and a second switch blade 52 connected by conductor 53 to a switch blade 54 of latching relay 20. Down-limit switch 46 also includes a second contact 55 which is connected by conductor 56 to the junction of the secondary winding 57 of current transformer 22 and a parallel connected resistor R1.

The latching relay 20 includes a coil 60 operative to move blade 54 between a first contact 62 and a second contact 63. In addition, a second switch blade 64 is connected by conductor 65 to the alternating current source 34 and is movable by coil 60 between terminals 42 and 50. The contacts 62 and 63 are respectively connected by conductors 66 and 67 to one end of end of potentiometers R2 and R3 which form a part of safety circuit 21.

The receiver 12 may be of any conventional type employed in garage door openers and includes a regeneration oscillator 70 connected to an antenna 71, a high frequency amplifier 72 connected to a regenerative oscillator 70, and an audio amplifier 73 connected to a high frequency amplifier and by conductor 74 to an audio detector 76 which forms a part of the control circuit 18. Those skilled in the art appreciate that when the push button 77 of transmitter 14 is closed, the resulting signal will be detected by receiver 12 which will provide an appropriate signal across resistor R4 of detector 76.

As will be discussed more fully below, when a potential appears across resistor R4 or when push button 16 is closed, a gate signal will be provided to SCR1 which then becomes operative to actuate latching relay 20 thereby initiating a door reversing operation. Control circuit 18 also includes a clamp circuit 78 which maintains Q2 non-conductive for a predetermined time delay to eliminate the possibility that transient effects of motor starting and door inertia will initiate a false safety operation. After a brief time delay, determined by a first time delay circuit 80, SCR1 is reset in preparation for a subsequent operation and the clamp circuit 78 is reset after a time delay determined by a second time delay circuit 81. In the event door 11 engages an obstacle, the resulting increase in motor current will be reflected by a gate signal provided to SCR1 from safety circuit 21 whereby the latching relay 60 will be operated to effect reversal of motor direction.

Power may be supplied to control circuit 18 in any suitable manner such as by means of an isolation transformer 82 which has a primary winding connected to alternating current supply 34. Connected to the secondary of transformer 82 is a conventional series regulator 84. The details of regulator 84 form no part of the present invention and accordingly will not be discussed in detail. It will be sufficient for purposes of understanding the invention to state that alternating current source 34 may provide household line voltage such as 110 volts to the primary of isolation transformer 82. The voltage across the secondary of transformer 82 may, for example, be 24 volts while the output of series regulator 84 provides a DC voltage of 12 volts at conductor 86.

Detector 76 includes a transistor Q1 whose emitter and base are respectively connected to conductor 86 and resistor R4. The collector of transistor Q1 is connected through time delay circuit 80 to the gate of SCR1. Time delay circuit 80 includes resistors R5 and R6, and diode D1 connected in series between the collector of Q1 and the gate of SCR1. Connected between the junction of resistors R5 and R6 and groud conductor 88 is a first capacitor C1 while a second capacitor C2 and resistor R7 are connected between the gate of SCR1 and conductor 88.

One terminal of switch 16 is connected to power supply conductor 86 and the other terminal of switch 16 is connected by resistor R8 and capacitor C3 to the junction between resistor R6 and diode D1. Also, shunting capacitor C3 is a circuit consisting of resistor R9 and diode D2 connected in series.

Clamping circuit 78 includes a transistor Q2 whose collector is connected by resistor R10 to the gate of SCR1. The base of Q2 is connected to the time delay circuit 81 consisting of resistor R11 and capacitor C4. In addition, capacitor C4 is connected by diode D3 to the junction between resistor R6 and diode D2 and the other terminal of capacitor C4 is connected to ground conductor 89. Resistor R11 is connected between the base of transistor Q2 and the junction between diode D3 and capacitor C4.

The latching relay coil 60 is connected in series with the anode-cathode circuit of SCR1 between the secondary winding of transformer 82 and the ground conductor 88. Diode D5 maintains uni-directional current flow. Capacitors C5 and C6 respectively shunt latching relay winding 60 and the anode and cathode of SCR1.

Each of the switch blades of limit switches 46 and 38, and latching relay 20, are shown in their door open position by full lines in FIG. 1. In the event a door closing operation is to be initiated by use of the transmitter 14, the resultant signal will provide a voltage across R4 so as to turn on transistor Q1. This provides a gate signal to SCR1 to complete an energizing circuit through latching relay coil 60 which moves switch blades 54 and 64 to contacts 62 and 50, respectively. An energizing circuit is thereby completed through the door-close winding 26 of motor 10 by the path which includes primary winding 31 of current transformer 22, winding 26, contact 44 and switch blade 48 of down limit switch 46, contact 50 and switch blade 64 of latching relay 20 and conductors 49 and 65. As a result, the motor 10 will commence the lowering of door 11.

When transistor Q1 turns on as a result of a signal from receiver 12, the flow of collector current through resistors R5 and R6 will turn on transistor Q2 which becomes conductive to connect to ground the junction 90 between resistor R10 in the SCR1 gate circuit and resistor R12 of the safety circuit 21.

The conduction of transistor Q1 will also charge capacitor C1 and capacitor C2 of time delay circuit 80 and capacitor C4 of the time delay circuit 81. As will be discussed more fully below, in the preferred embodiment of the invention, the transmitter 14 is constructed and arranged to provide an impulse signal of short duration. However, even if a transmitter is provided which delivers a continuous signal, it too will terminate when push button 77 is released. In either case, when the transmitter 14 signal terminates, transistor Q1 becomes non-conductive. SCR1 will remain conductive until capacitors C1 and C2 discharge through resistor R7. After capacitors C1 and C2 have discharged the gate signal to SCR1 will terminate so that SRC1 will turn off and thus be reset in preparation for a subsequent operation.

Upon the termination of the transistor Q1 signal, capacitor C4 will discharge through resistor R11 and the base-emitter circuit of transistor Q2 after which transistor Q2 will turn off isolating point 90 from ground. This sets the safety circuit in the event a safety operation becomes necessary as will be described below.

In the event the garage door 11 encounters an obstacle in its downward movement, the increased load will cause a surge in the current flowing through door-close winding 26 and consequently the primary of current transformer 31. This will be reflected in an increase in the current flowing in secondary 57 of current transformer 22 and the path defined by conductor 56, contact 55, and switch blade 52 of down-limit switch 46, conductor 53, switch blade 54, and contact 62 of latching relay 20 and potentiometer R2 of safety circuit 21. If terminal 90 is ungrounded, i.e., if transistor Q2 has been turned off, a gate signal will be provided to SCR1 through resistors R10 and R7. This will render SCR1 conductive to energize latching relay winding 60 which moves switch blades 54 and 64 to contacts 63 and 42 respectively as shown by full lines in FIG. 1. This will complete an energizing circuit through the motor door-open winding 24 thereby reversing motor 10 and causing the door to move upwardly towards its open position. As a result, any person or object engaged by the door will not suffer injury. The time delay circuit 81 performs the function of grounding junction 90 for a predetermined short period after operation is commenced so that transient motor starting and inertia effects do not trigger a false safety signal. The delay is governed by the size of capacitor C4 and resistor R11. In one example, two microfarad capacitor and a 120K resistor provided about a one second delay which permitted the door to move about one foot.

Assume that door 11 in its downward movement does not engage an obstacle. In that event, a predetermined movement of the door will operate the down-limit switch 46 causing the switch blades 48 and 52 to move from contacts 44 and 55, respectively, to contacts 92 and 94 thereby open circuiting door-close winding 26 and uncoupling the safety circuit 21 so that engagement of the door with the garage floor will not cause a reversal.

When the door 11 is down, each of the switches will be in their positions shown by broken lines in FIG. 1. The initiation of a door opening operation is the same as in a closing operation in that transistor Q1 is rendered conductive to gate SCR1 which in turn energizes latching relay coil 60. This moves switch blades 54 and 64 to contacts 63 and 42, respectively, thereby energizing door-open winding 24 through a path defined by conductor 65, switch blade 64, contact 42, conductor 41, switch blade 40, and contact 36. As the door 11 begins its upward movement, limit switch 46 will operate to move switch blades 48 and 52 from their positions shown by broken lines to their positions shown by full lines thereby reconnecting safety circuit 21 to the secondary 57 of current transformer 22. As a result, should the door 11 encounter an obstacle in its upward movement and assuming that transistor Q2 has turned off so that terminal 90 is disconnected from ground, a gate signal will be provided to SCR1 through potentiometer R3. SCR1 will then operate to energize latching relay coil 60 whereby switch blades 54 and 64 are moved to their positions shown by broken lines. The circuit to the door-open winding 24 is disconnected and the circuit completed through door-close winding 26. The door 11 will then reverse and begin movement toward its closed position. On the other hand, should door 11 not engage an obstacle in its upward movement, it will continue in such movement until up-limit switch 38 is actuated to move switch blade 40 from its position shown by broken lines to its position shown by full lines whereby door-open winding 24 is open circuited.

While operation of the door closer has been discussed with respect to the use of transmitter 14 and receiver 12, operation may also be initiated by switch 16. When operation is initiated in this manner, a circuit is completed between power supply conductor 86 and the gate of SCR1 through resistors R8, R9, diodes D2 and D1. As a result, SCR1 will effect a door opening or closing operation in a manner similar to that discussed with respect to the transmitter 14.

The closing of switch 16 will also charge capacitor C3 through resistor R8, diode D2, and resistor R9. As a result, the gate signal will flow to SCR1 only until capacitor C3 becomes charged. When the gate signal ceases, SCR1 will become non-conductive. In this manner, SCR1 is reset and will thereby be in a condition to reverse the door operation should the signal be received through safety circuit 21 even if switch 16 is held closed. Further, if the switch 16 is operated in rapid succession, door reversal will not occur as a result of the delay introduced by capacitors C2 and C3 and resistors R7 and R9. The potentiometers R2 and R3 of the safety circuit 21 are provided so that the sensitivety of the system can be individually adjusted for opening and closing operation since the motor load will be different for each and in each case different with respect to different doors. As an alternative, a single potentiometer can be employed in series with diode D4 and resistors R2 and R3 can be fixed with R3 about 50% larger than R2.

As an added safety feature, a foot switch 96 and resistor R12 may be provided between the gate of SCR1 and power supply conductor 86. As those skilled in the art will appreciate, foot switch 96 is a well known device which operates when engaged. Specifically, a switch blade 98 is mounted on the lower end of the door and within a rubber strip. Should the door encounter an obstacle while descending, the switch blade 98 will close thereby providing a gate signal to SCR1 which will result in door reversal in the manner discussed above. The switch blade 98 may be provided as a back-up to the safety circuit 21.

The transmitter 14 includes a conventional low-frequency oscillator 102 and a high frequency oscillator 104. When energized, the oscillating circuits 102 and 104 are operative to provide a radio frequency modulated signal through antenna 106 for actuating the control circuit as discussed previously. The oscillators 102 and 104 are conventional and accordingly will not be discussed in detail. It will be sufficient for purposes of understanding the invention to state that each of the oscillators will become operative when appropriate potential is provided at junctions 108 and 110. Towards this end, battery B, switch 77, and capacitor C7 are connected in series between ground conductor 112 and terminal 114. In addition, resistor R13 is connected in shunt with the series combination consisting of capacitor C7, battery B and switch 77. Terminal 114 is connected to junction 108 by conductor 116 and to junction 110 through the tuning circuit 118 of the low frequency oscillator 102. When switch 77 is closed, charging current will flow to capacitor C7 which will turn on each of the transistors Q3 and Q4 of oscillators 102 and 104. When capacitor C7 is fully charged, the charging current will cease flowing and transistors Q3 and Q4 will turn off. In this manner, closing of switch 77 will cause a signal of predetermined duration to be transmitted from transmitter 14 regardless of whether or not switch 77 is held in a closed position or is rapidly opened and closed.

From the foregoing, it will be appreciated that the garage door operating circuit according to the present invention provides a relatively rapidly responsive and sensitive system for initiating door reversal regardless of the direction of door travel whenever the door encounters an obstacle in its path. Further, the circuit according to the invention is not fooled by rapid repetitions in operation of the manual or radio push buttons nor will the safety circuit be blocked if the buttons are held in a closed position.

While only a single embodiment of the present invention has been illustrated and described, it is not intended to be limited thereby, but only by the scope of the appended claims.

I claim:

1. A garage door opening and closing apparatus including a reversible motor means adapted to be coupled to a garage door, a power source, first switching means in circuit between said motor means and said power source and having a first position for completing an energizing circuit to said motor means for operation in a first direction whereby said door is operated in a door closing direction and a second position for completing an energizing circuit to said motor means for operation in a second direction whereby said door is operated in a door opening direction, second switching means operative to actuate said first switching means for operation between said first and second positions, actuating means for actuating said second switching means, time delay means coupled to said actuating means and to said second switching means for resetting said second switching means in preparation for a subsequent operation of said first switching means after a predetermined time delay, safety means operatively associated with said motor means and operable to actuate said second switching means in the event the door to which said motor means is coupled engages an obstacle while said motor means is operating in a door closing direction and a door opening direction, and clamp means for disabling said safety means for a second predetermined time delay after said second switching means is operated by said actuating means.

2. The apparatus set forth in claim 1 wherein said actuating means comprises a push button and radio receiving means each coupled to said second switching means for independently operating said second switching means.

3. The apparatus set forth in claim 1 and including second time delay means coupled between said actuating means and said clamp means for disabling said safety means for said second predetermined time delay after the actuation of said second switching means.

4. The apparatus set forth in claim 1 wherein said motor means comprises a reversible electric motor having first and second winding means and operable in a first direction when said first winding means is energized and in a second direction when said second winding means is energized, said first switching means being operative to energize said first winding means when in its first position and said second winding means when in its second position.

5. The apparatus set forth in claim 4 wherein said first switching means includes coil means operable when energized to switch said first switching means to its other position, said coil means being in circuit with said second switching means, and wherein said second switching means includes gate means and anode and cathode means in circuit with said coil means, said second switching means being operative to conduct current from its anode means to its cathode means upon receiving a predetermined signal at its gate means, said gate means being coupled to said actuating means for receipt of a gate signal when said actuating means is operated and to said safety means for receipt of an actuating signal therefrom.

6. The apparatus set forth in claim 5 wherein said time delay means includes resistance and capacitance means coupled between said actuating means and said gate means for maintaining said gate signal for a predetermined time after the operation of said actuating means terminates.

7. The apparatus set forth in claim 5 wherein said clamp means is coupled to said gate means, said safety means comprises safety circuit means coupled to the path of said first or second winding means and providing a gate signal to the gate means in the event the current in said first or second winding means increases above a predetermined level, said clamp means shunting said safety circuit means until after said second predetermined time delay.

8. The apparatus set forth in claim 7 including second time delay means coupled between said actuating means and said clamp means, wherein said clamp means includes a switching circuit device having first and second terminals in circuit with said safety circuit means and a third terminal coupled to said second time delay means, said switching circuit device being operative to shunt said safety circuit means on the receipt of a predetermined signal at its third terminal, said second time delay means being operative to maintain said signal for a predetermined time after said actuating means is operated.

9. The apparatus set forth in claim 1 and including foot switch means in circuit between said power source and said gate means and being operative to provide a gate signal when engaged, said foot switch means being constructed and arranged to be mounted at the lower edge of the door whereby said second switching means will be actuated in the event the lower edge of said door engages an obstacle, and limit switch means for disabling said motor means as said door approaches its upper and lower limits.

10. The apparatus set forth in claim 2 and including a transmitter, said transmitter including a low frequency oscillator and a high frequency oscillator tuned to said radio receiving means for providing an actuating signal thereto, switch means for energizing said low frequency oscillator, and a time delay circuit coupled to said low frequency oscillator for interrupting said energizing circuit after a predetermined time delay.

11. A garage door opening and closing apparatus including a reversible motor means adapted to be coupled to a garage door, an energy source, circuit switching means having a first state for completing an energizing circuit to said motor means for operation in a first direction whereby said door is moved in a door closing direction and a second state for completing an energizing circuit to said motor means for operation in a second direction whereby said door is moved in a door opening direction, said circuit switching means being operative upon receipt of an actuating signal to move from one of its states to the other, actuating means selectively operable providing an actuating signal to said circuit switching means, safety means operatively associated with said motor means and operable to provide an actuating signal to said circuit switching means in the event the door to which said motor means is coupled engages an obstacle while moving in a door opening direction and a door closing direction, and clamp means for disabling said safety means for a predetermined time after said circuit switching means is operated by said actuating means.

12. The apparatus set forth in claim 11 and including time delay circuit means coupled between said actuating means and said clamp means for disabling said safety means for said predetermined time after the actuation of said circuit switching means.

13. The apparatus set forth in claim 11 wherein said motor means comprises a reversible electric motor having first and second winding means and operable in a first direction when said first winding means is energized and in a second direction when said second winding means is energized, said circuit switching means being operative to energize said first winding means when in its first state and said second winding means when in its second state.

14. The apparatus set forth in claim 12 wherein said circuit switching means includes gate means and is operative to change states upon receiving a predetermined signal at its gate means, said gate means being coupled to said actuating means for receipt of a gate signal when said actuating means is operated and to said safety means for receipt of an actuating signal therefrom.

15. The apparatus set forth in claim 14 wherein said clamp means is coupled to said gate means, said safety means comprises circuit means coupled to sense the current in said first or second winding means and providing a gate signal to the gate means in the event the current in said first or second winding means increases above a predetermined level, said clamp means shunting said safety circuit means until after said predetermined time.

16. The apparatus set forth in claim 12 wherein said clamp means includes a switching circuit device having first and second terminals in circuit with said safety means and a third terminal coupled to said time delay circuit means, said switching circuit device being operative to shunt said safety means on the receipt of a predetermined signal at its third terminal, and said time delay circuit means being operative to maintain said signal for a predetermined time after said actuating means is operated.

17. The apparatus set forth in claim 14 wherein said safety means includes a circuit having therein adjustable resistance means respectively connected by the switching of said circuit switching means to the gate means of said circuit switching means in accordance with the current above a predetermined level in said first or second winding means whereby the current in the safety means necessary to actuate said circuit switching means may be adjusted for each said winding means.

18. The apparatus set forth in claim 4 wherein said first switching means includes first and second switching devices each having first and second positions, wherein the energizing circuits including said first and second winding means are respectively completed via the first and second positions of said first switching device, and wherein said safety means includes a motor load sensing circuit having first and second adjustable resistance means therein respectively connected via the first and second positions of said second switching device to provide an actuating signal to said second switching means, whereby the current necessary to actuate said second switching means may be independently adjusted for each of said winding means.

* * * * *